(12) United States Patent
Barker et al.

(10) Patent No.: US 7,993,019 B2
(45) Date of Patent: Aug. 9, 2011

(54) ENCLOSURE FOR A LASER SCANNER FOR USE IN A SAWMILL

(75) Inventors: Earl M. Barker, Enumclaw, WA (US); Kevin J. Barker, Enumclaw, WA (US)

(73) Assignee: EB Associates, Inc., Enumclaw, WA (US)

( * ) Notice: Subject to any disclaimer, the term of this patent is extended or adjusted under 35 U.S.C. 154(b) by 1406 days.

(21) Appl. No.: 11/498,428

(22) Filed: Aug. 2, 2006

(65) Prior Publication Data

US 2008/0030722 A1 Feb. 7, 2008

(51) Int. Cl.
*F21V 33/00* (2006.01)
*F21K 7/00* (2006.01)
*B26D 5/00* (2006.01)

(52) U.S. Cl. ............................. 362/89; 83/365; 362/259

(58) Field of Classification Search .................... 33/286; 83/520, 522, 471.3, 477.1, 365, 521; 362/89, 362/259; 396/324; 702/33, 34, 40

See application file for complete search history.

(56) References Cited

U.S. PATENT DOCUMENTS

| | | | |
|---|---|---|---|
| 3,938,218 A * | 2/1976 | DeAmicis | 15/401 |
| 4,402,106 A * | 9/1983 | Mattson | 15/406 |
| 6,649,868 B2 * | 11/2003 | Pratt et al. | 219/121.86 |
| 6,681,672 B2 * | 1/2004 | Myrfield | 83/367 |
| 7,267,039 B2 * | 9/2007 | Liao et al. | 83/520 |
| 2002/0024677 A1 * | 2/2002 | Metcalfe et al. | 356/625 |
| 2003/0138023 A1 * | 7/2003 | Ozasa | 372/108 |
| 2006/0053990 A1 * | 3/2006 | Barker | 83/74 |

* cited by examiner

*Primary Examiner* — Jong-Suk (James) Lee
*Assistant Examiner* — Stanley Weinberg
(74) *Attorney, Agent, or Firm* — Jensen & Puntigam, P.S.

(57) ABSTRACT

The laser enclosure includes an enclosure body which is adapted to accommodate a laser scanner therein. The enclosure with the laser assembly is used in a sawmill environment. The enclosure body includes an assembly for moving the mounted enclosure body to obtain and maintain a desired orientation and aiming for the laser scanner relative to a companion laser scanner. A movable front plate/door comprises one part of the enclosure body, mounted and arranged to be movable to an open position, permitting access to the interior of the enclosure body. The movable door also includes openings for the laser scanner components.

7 Claims, 4 Drawing Sheets

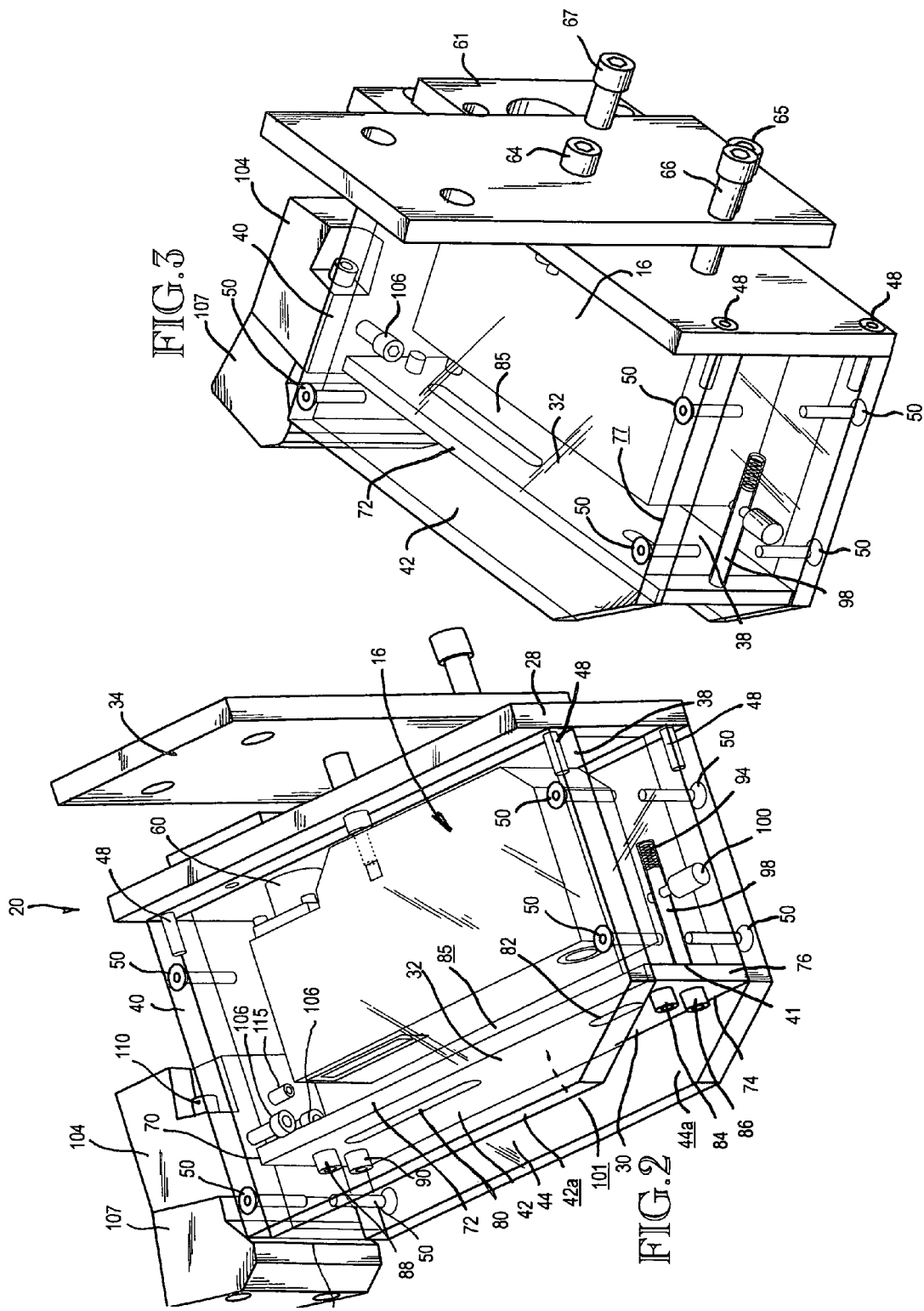

US 7,993,019 B2

ENCLOSURE FOR A LASER SCANNER FOR USE IN A SAWMILL

TECHNICAL FIELD

This invention relates generally to the use of lasers in a sawmill environment for making lumber workpiece measurements, and more specifically concerns protection for the laser in such an environment to keep it free of debris and prevent physical damage thereto.

BACKGROUND OF THE INVENTION

Presently, laser technology is used to measure lumber workpieces in a sawmill operation, including incoming logs as well as lumber pieces produced during the sawing process. These laser measurements are very accurate, which helps in the making of appropriate sawing decisions to produce maximum yield from the incoming logs.

To produce these desired results, however, the lasers must be accurately positioned and aimed, must be regularly calibrated and must remain free from interfering debris, dust, etc. It is well known that a sawmill is an extremely harsh and dirty environment, and includes a risk of physical damage to the mill equipment, including the lasers, during the operation of the sawmill. The lasers must be mounted in a way that enables them to take the required dimensional measurements, but also such that they are convenient to aim and to calibrate when necessary. Typically, the sawmill operator will purchase lasers and then use the sawmills' own enclosures for protection, but usually it remains difficult and inconvenient to obtaining and properly install the enclosures, as well as aiming the lasers within the enclosures and maintaining the lasers free of debris with such arrangements.

SUMMARY OF THE INVENTION

Accordingly, the present invention is an enclosure for a laser scanner unit used in a sawmill environment, comprising: an enclosure body, adapted to accommodate the mounting of a laser scanner unit therein for making measurements of a workpiece in the sawmill; an assembly for mounting the enclosure body to obtain a desired orientation and aiming of the laser scanner relative to the workpiece, wherein the enclosure assembly is physically adjustable by the mounting assembly; and a movable door comprising one part of the enclosure body, permitting access to the interior of the enclosure body when it is in an open position and including openings for the laser beam and a camera in the laser scanner unit.

BRIEF DESCRIPTION OF THE DRAWINGS

FIG. 2 is a first perspective view of a sawmill laser enclosure assembly.

FIG. 3 is another perspective view of the laser enclosure assembly.

BEST MODE FOR CARRYING OUT THE INVENTION

Figure 1:
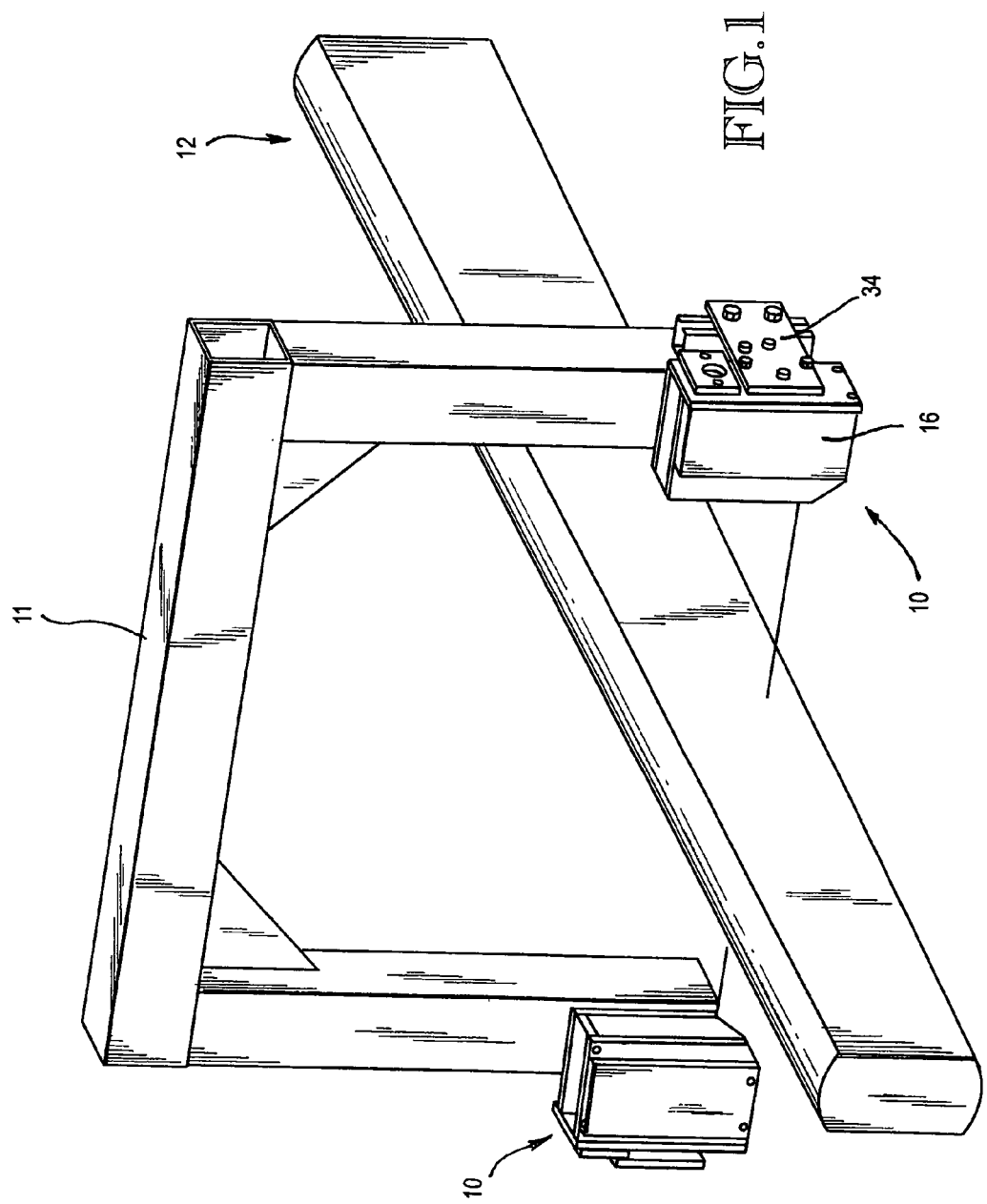
FIG. 1 is an environmental view showing a laser system and enclosures therefor, such as described herein, in a typical sawmill environment.
Figure 4:
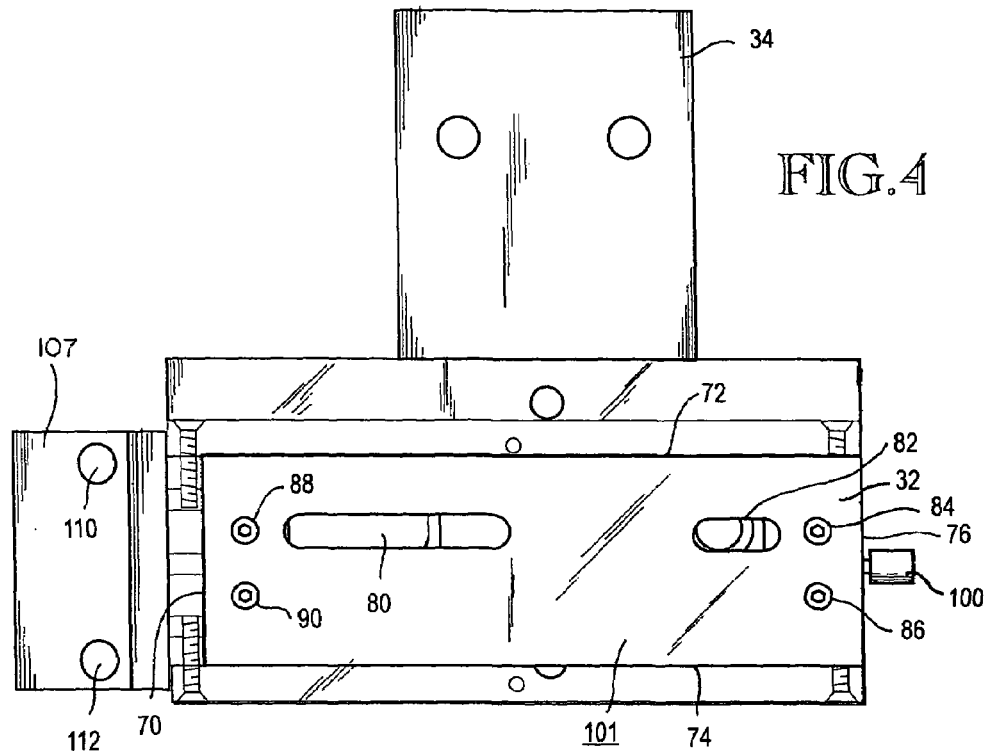
FIG. 4 is a front elevational view of the laser enclosure assembly.
Figure 5:
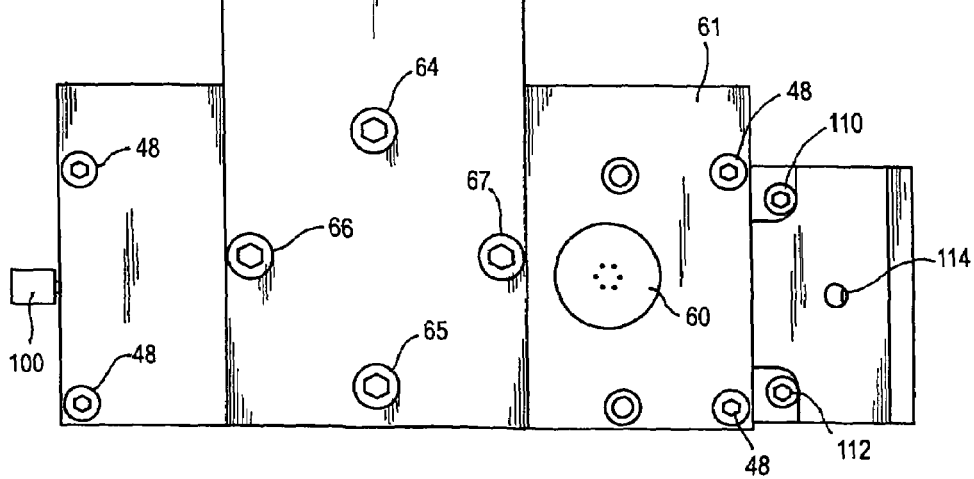
FIG. 5 is a rear elevational view of the laser enclosure assembly.

Referring to FIG. 1, a laser enclosure assembly 10 is shown in a sawmill environment to illustrate generally the function and advantages of an enclosure assembly. Typically, there will be two laser enclosure assemblies for each measurement installation in the sawmill. Each enclosure assembly contains a laser scanner combination for measurement of a selected dimension of a workpiece in the sawmill. The workpiece could include an incoming log or a lumber piece which has been sawn or partially sawn from a log. The workpiece shown generally at 12 typically rides on a conveyor or is drawn by a chain as it moves within the sawmill. Two opposing enclosure assemblies 10-10 are positioned on a mounting assembly 11. It should be understood that FIG. 1 shows a simple sawmill environment for illustration of one sawing operation and is not intended to be a representation of a complete sawmill environment.

Each enclosure assembly 10 will include, as indicated above, a conventional laser which will do the actual measurement and a camera 18, in a sealed unit 16, referred to as a "laser scanner". The laser and the camera are precisely lined up with each other inside the sealed unit and then calibrated at the factory to produce the desired measurement accuracy. Various well-known laser scanners can be used in the present system and are available commercially. One example is a single point Hermary LRS-50 laser scanner. Other suitable laser scanners are commercially available.

The laser enclosure assembly described herein is typically mounted to a mounting assembly 11 or similar arrangement in the sawmill. This is accomplished by a mounting plate 34, which is discussed in more detail below.

Figure 6:
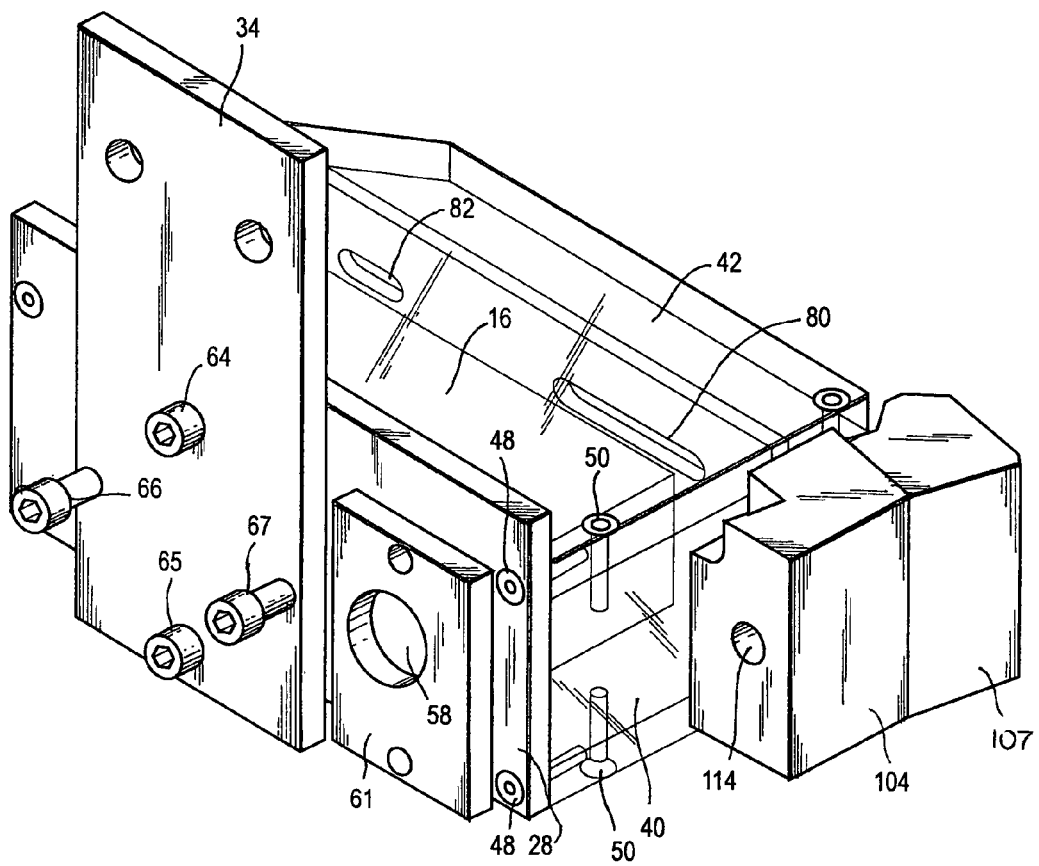
FIG. 6 is another perspective view of the laser enclosure assembly.

Referring now to FIGS. 2-6, and particularly to FIGS. 2, 3 and 6, a laser scanner enclosure assembly 20 generally comprises a number of panel/plate members held together by countersunk machine screws. A rear plate 28 and a front plate/door 32 are made from aluminum, approximately ¼-inch thick. Two side plates 38 and 40, as well as the top and bottom plates 42 and 44 are, in the embodiment, shown made from a polycarbonate plastic, approximately ½-inch thick. The various plates comprising the enclosure 10, i.e. the top and bottom plates, the front/door plate, the rear plate and the two side plates, form a very strong, stable enclosure, with the transparent polycarbonate plates permitting a view into the interior of the enclosure without dismantling the enclosure.

The rear plate 28 is secured to the top and bottom plates 42 and 44 by four screws 48-48 which are located approximately at the lower corners of the rear plate and a short distance down from the upper corners of the rear plate, since the rear plate extends approximately ¾ inch above the top plate. The bottom and top plates 42 and 44 are in turn each connected to the two opposing side plates 38 and 40, respectively, by four screws 50-50. The screws extend through the top and bottom plates into the longitudinal edges of the side plates.

The rear plate and the two side plates are approximately rectangular, with the rear plate in the embodiment shown being approximately 4 by 8 inches. Both side plates are approximately 2¼ inches high, with side plate 38 being approximately 3¾ inches long, while the other side plate 40 is somewhat longer, approximately 5 inches long.

The top and bottom plates 42 and 44 are substantially identical in configuration, approximately rectangular, with one corner edge portion 54 of both the top and bottom plates 42, 44 adjacent side plate 38 being angled.

Laser scanner 16 in the embodiment show is approximately 5¾ inches long by 3 inches deep by 1¾ inches high. As indicated above, a Hermary LRS-50 laser scanner or similar laser scanner is used. The laser scanner is mounted to the rear plate 28 by two screws, cap screws in the embodiment shown, or other fastener members. Power and data connections are made to the laser scanner assembly 16 through an opening 58 in rear plate 28 through a connector member 60 at the rear of the laser scanner. The cable (not shown) leading to the laser scanner from the source of electric power and to the system computer is protected by a small connector plate 61, which surrounds opening 58 to the enclosure and is secured to rear plate 28 by screws or the like.

The mounting plate 34 is fixedly connected to a mounting member/assembly in the sawmill by means of bolts or similar members. Mounting plate 34 is connected to the enclosure assembly 10 by means of four cap screws 64-67. Two vertically aligned cap screws 64 and 65 extend into rear plate 28 and, when turned, pull the enclosure assembly toward the mounting plate. Horizontally aligned cap screws 66 and 67 bear against the rear surface 29 of rear plate 28 and tend to push the rear end of the enclosure assembly away from the mounting plate. This arrangement, in which two cap screws push on the enclosure assembly and two pull, provide an aiming adjustment capability necessary for the laser scanner 16 to line up with an opposing laser scanner. An important consideration with the present structure is that aiming of the laser scanner 16 is accomplished by moving the entire enclosure assembly 10, with the laser scanner 16 therein, instead of the laser scanner by itself, as is the case generally with sawmill laser scanner systems.

The front plate/door 32 is mounted to the enclosure assembly 10 in such a way that it is conveniently partially removable from the enclosure assembly, permitting access to the interior of the enclosure assembly. Front plate/door 32 is in the embodiment shown a rectangular aluminum plate, approximately 7½ inches long and 2½ inches high. One side edge 70 fits into a shallow mating slot in side plate 40, while the top and bottom edges 72 and 74 fit into shallow mating slots in the lower surface 42*a* of top plate 42 and the upper surface 44*a* of bottom plate 44, respectively. The other side edge 76 extends to adjacent front end edge 41 of side plate 38, permitting the front plate/door to be slid sideways away from side wall 40, opening up the interior of the enclosure.

Front plate 32 has two openings 80 and 82 therethrough which are in registry with the laser beam and the camera lens in the laser scanner. The actual shapes of the openings can vary and in fact can be quite small, sufficient to accommodate the laser beam and the camera lens view, while minimizing physical access to the interior of the enclosure to minimize entry of debris, etc.

A first set of two cap screws 84 and 86 are positioned near side edge 76 of the front plate. These cap screws do not extend beyond the inner surface 85 of the front plate, and function as a handle by which the user can move and slide the plate away from side wall 40.

A second set of cap screws 88 and 90 are positioned adjacent side edge 70 of front plate/door 32. These cap screws extend past the inner surface 85 of the front plate/door 32 and act as a stop for the front plate when they come into abutting contact with the inner surface 77 of side wall 38 of the enclosure assembly. In this position, the front plate 32 is at its extreme open position, permitting maximum access to the interior of the enclosure assembly.

A spring/pin arrangement maintains the front panel 32 in a locked position when it is closed. An internal slot 94 in side plate 38 extends to the end of the side plate adjacent front plate 32, and is registry with a shallow opening (not shown) in the front panel. Within slot 94 is a spring 96 and a pin 98 which is connected to the spring and extends in the direction of the front panel from the end of the spring 76. Extending outwardly from pin 98, through side plate 38 is a latch knob 100. In use, when the front panel/door is to be opened, latch knob 100 is moved toward the rear of the enclosure assembly, away from front panel 32, against the action of spring 96 until pin 98 comes free from the front panel/door 32. The door may then be opened by acting on cap screws 84 and 86, sliding door 32 out from its closed position to a desired open position. When the door is returned to its closed position, the pin 48 snaps back into place in the front panel, locking the front panel.

In especially dirty environments, air is blown into the enclosure assembly and outside of the front plate 32, such as along the outer surface 101. This is accomplished in the embodiment shown by a two-part assembly comprising an aluminum block 104, which is attached to side plate 40 from the inside of the enclosure assembly by two cap screws 106, and a commercially available air device. One such device is known as an air knife, available from Exair, shown at 107. The air knife 107 is attached to aluminum block 104 by two screws 110 and 112. Compressed air is provided to the aluminum block and then into the air knife using an O-ring (not shown) from a standard conventional source thereof through channel 114. Channel 114 also connects to a small opening 115 which extends into the interior of the enclosure assembly. Air knife 107 includes a thin opening 120 which extends for approximately the height of front plate 32, through which air is moved.

In operation, the compressed air directed into the interior of the enclosure assembly through opening 115 provides a positive pressure to the interior of the enclosure assembly, resulting in air flow out from the enclosure assembly through the openings 80, 82 in the front plate/door 32. Air also proceeds from the thin opening 120 in the air knife 107, as discussed above, producing a thin curtain of air along the outer surface of front plate 32. This arrangement maintains the front plate 32 and the enclosure free of dust and debris, so that the laser and the camera can both operate properly and accurately.

Hence, an enclosure assembly has been described which provides a convenient and reliable way of installing and aiming a laser scanner for use in sawmills. The laser scanner is mounted inside the enclosure assembly and this arrangement maintains the laser scanner unit free from debris and dust, so that accurate measurements may be made and provided to the system computer for computation and analysis and to provide appropriate sawing instruction to produce a desired lumber yield.

Although a preferred embodiment of the invention has been disclosed for purposes of illustration, it should be understood that various changes, modifications and substitutions may be incorporated in the embodiment without departing from the spirit of the invention which is defined by the claims which follow.

What is claimed is:

1. An enclosure for a laser scanner used in a sawmill environment, comprising:
   an enclosure body, adapted to accommodate the mounting of a laser scanner therein for making measurements of a workpiece in the sawmill;
   an assembly for mounting the enclosure body to obtain a desired orientation and aiming of the laser scanner relative to the workpiece, wherein the enclosure body is physically adjustable by the mounting assembly;
   a movable door comprising one part of the enclosure body, permitting access to the interior of the enclosure body when it is in an open position and including openings for the laser beam and a camera in the laser scanner; and an air directing assembly, mounted to a side plate, which receives compressed air from a source thereof and directs it in front of the movable door, keeping it free from debris, wherein the air directing assembly includes an opening which is in registry with an opening in the side plate for permitting air into the interior of the enclosure body, resulting in a cleaner environment within the enclosure body, the debris therein being moved out through the openings in the movable door portion of the enclosure body.

2. The system of claim 1, wherein the enclosure body includes a top plate member, a bottom plate member, a rear plate member, two side plate members and the door, wherein the top plate member, the bottom plate member and the two side plate members are made from a transparent plastic material, while the rear plate member and the movable door are made from aluminum.

3. The system of claim 1, wherein the mounting assembly includes a mounting plate which is attachable to a mounting member within the sawmill environment, and wherein the mounting assembly further includes adjusting elements which extend from the mounting plate and operate on the enclosure body to adjust the aim of the enclosure body relative to a companion laser scanner.

4. The system of claim 3, wherein the adjusting elements include four screw members which extend through the mounting plate, coming into contact with the enclosure body for moving the enclosure body into multiple orientations relative to the mounting plate, which is fixed in space.

5. The system of claim 1, wherein the movable door is mounted so as to slide partially away from the enclosure body into an open position, and then slide back into the enclosure body into a closed position.

6. The system of claim 5, wherein the movable door includes stop members for preventing the movable door from separating from the enclosure body.

7. The system of claim 2, including a spring latch mechanism mounted in a side plate, arranged so that when the movable door is in a closed position, a spring-biased pin extends into the movable door, latching the movable door in the closed position, the spring latch mechanism further including an extending knob member which is connected to the pin such that when the knob member is pushed against the bias of a spring portion of the mechanism, the pin is moved away from contact with the movable door, permitting the movable door to be slid open.

* * * * *